United States Patent
Enga

(10) Patent No.: US 12,086,161 B2
(45) Date of Patent: Sep. 10, 2024

(54) TRANSFORMING RELATIONAL STATEMENTS INTO HIERARCHICAL DATA SPACE OPERATIONS

(71) Applicant: Craxel, Inc., Chantilly, VA (US)

(72) Inventor: David Enga, Chantilly, VA (US)

(73) Assignee: Craxel, Inc., Chantilly, VA (US)

( * ) Notice: Subject to any disclaimer, the term of this patent is extended or adjusted under 35 U.S.C. 154(b) by 0 days.

(21) Appl. No.: 17/808,961

(22) Filed: Jun. 24, 2022

(65) Prior Publication Data

US 2023/0008502 A1    Jan. 12, 2023

Related U.S. Application Data

(60) Provisional application No. 63/203,148, filed on Jul. 9, 2021.

(51) Int. Cl.
  *G06F 16/28* (2019.01)
  *G06F 16/22* (2019.01)
  (Continued)

(52) U.S. Cl.
  CPC .......... *G06F 16/282* (2019.01); *G06F 16/221* (2019.01); *G06F 16/24552* (2019.01); *G06F 16/288* (2019.01)

(58) Field of Classification Search
  CPC .................. G06F 16/282; G06F 16/221; G06F 16/24552; G06F 16/288; G06F 16/28;
  (Continued)

(56) References Cited

U.S. PATENT DOCUMENTS 5,701,467 A    12/1997    Freeston
5,724,512 A    3/1998    Winterbottom
(Continued)

FOREIGN PATENT DOCUMENTS

WO    WO0203237 A1    1/2002
WO    2014094047 A1    6/2014

OTHER PUBLICATIONS

International Search Report and Written Opinion of the Internation Searching Authority mailed Sep. 22, 2002 in PCT/US22/73168, 6 pages.

(Continued)

*Primary Examiner* — Hosain T Alam
*Assistant Examiner* — Cecile H Vo
(74) *Attorney, Agent, or Firm* — Culhane PLLC

(57) ABSTRACT

A method for transforming a statement into at least one hierarchical data space operation may include analyzing the statement to produce at least one transformed statement. The method may further include selecting at least one element of the transformed statement. The method may further include determining at least one column for the at least one element. The method may further include generating at least one hierarchical data space operation for the at least one element. The method may further include extracting at least one value from the at least one element for the at least one column. The method may further include determining at least one first logical hierarchical data space for the at least one hierarchical data space operation. The method may further include generating at least one first hierarchical path identifier for the at least one value that preserves the hierarchy of its first hierarchical data space, wherein each value corresponds to at least one subdivision of its first hierarchical data space. The method may further include associating the at least one first hierarchical path identifier with the at least one hierarchical data space operation.

30 Claims, 8 Drawing Sheets

(51) Int. Cl.
*G06F 16/2455* (2019.01)
*G06F 16/25* (2019.01)

(58) Field of Classification Search
CPC .... G06F 16/283; G06F 16/22; G06F 16/2219; G06F 16/245; G06F 16/2455; G06F 16/284; G06F 16/258; G06F 16/1794
See application file for complete search history.

(56) References Cited

U.S. PATENT DOCUMENTS

| | | | |
|---|---|---|---|
| 5,864,857 | A | 1/1999 | Ohata |
| 6,223,182 | B1 | 4/2001 | Agarwal |
| 6,252,547 | B1 | 6/2001 | Perry et al. |
| 6,401,029 | B1 | 6/2002 | Kubota et al. |
| 6,542,819 | B1 | 4/2003 | Kovacs et al. |
| 6,636,802 | B1 | 10/2003 | Nakano |
| 6,954,697 | B1 | 10/2005 | Smith |
| 7,382,244 | B1 | 6/2008 | Donovan et al. |
| 7,454,435 | B2 | 11/2008 | Friedman et al. |
| 7,720,436 | B2 | 5/2010 | Hamynen et al. |
| 10,416,919 | B1 | 9/2019 | Cai |
| 2001/0045965 | A1 | 11/2001 | Orbanes et al. |
| 2002/0004917 | A1 | 1/2002 | Malcolm |
| 2002/0055924 | A1 | 5/2002 | Liming |
| 2002/0091696 | A1 | 7/2002 | Craft et al. |
| 2002/0115453 | A1 | 8/2002 | Poulin et al. |
| 2002/0160766 | A1 | 10/2002 | Portman et al. |
| 2002/0161627 | A1 | 10/2002 | Gailey et al. |
| 2002/0161647 | A1 | 10/2002 | Gailey et al. |
| 2002/0184200 | A1 | 12/2002 | Ueda et al. |
| 2003/0036848 | A1 | 2/2003 | Sheha et al. |
| 2003/0220835 | A1 | 11/2003 | Barnes, Jr. |
| 2004/0019581 | A1 | 1/2004 | Davis et al. |
| 2004/0230467 | A9 | 11/2004 | Gailey et al. |
| 2005/0015307 | A1 | 1/2005 | Simpson et al. |
| 2005/0030194 | A1 | 2/2005 | Cheng et al. |
| 2006/0149774 | A1 | 7/2006 | Egnor |
| 2006/0188327 | A1 | 8/2006 | Moon |
| 2006/0206507 | A1 | 9/2006 | Dahbour |
| 2006/0265197 | A1 | 11/2006 | Peterson |
| 2007/0016565 | A1 | 1/2007 | Evans et al. |
| 2007/0041336 | A1 | 2/2007 | Wan et al. |
| 2007/0112808 | A1 | 5/2007 | Howard et al. |
| 2007/0234202 | A1 | 10/2007 | Lyness |
| 2007/0258623 | A1 | 11/2007 | McGrath et al. |
| 2008/0086464 | A1* | 4/2008 | Enga .................. G06F 16/29 707/999.102 |
| 2008/0126403 | A1 | 5/2008 | Moon |
| 2008/0183730 | A1 | 7/2008 | Enga |
| 2009/0150355 | A1 | 6/2009 | Garfinkle et al. |
| 2009/0164459 | A1 | 6/2009 | Jennings et al. |
| 2009/0192903 | A1 | 7/2009 | Weiss et al. |
| 2009/0307067 | A1 | 12/2009 | Obermeyer |
| 2010/0017261 | A1 | 1/2010 | Evans et al. |
| 2010/0042519 | A1 | 2/2010 | Dingler et al. |
| 2011/0016157 | A1 | 1/2011 | Bear |
| 2012/0124289 | A1 | 5/2012 | Kavuri et al. |
| 2013/0042052 | A1 | 2/2013 | Colgrove et al. |
| 2013/0198237 | A1* | 8/2013 | Serban ............. G06F 16/24534 707/792 |
| 2015/0356139 | A1* | 12/2015 | Demir ................ G06F 16/2452 707/713 |
| 2015/0356140 | A1* | 12/2015 | Demir ................ G06F 16/282 707/765 |
| 2016/0321375 | A1 | 11/2016 | Liu et al. |
| 2017/0068688 | A1 | 3/2017 | Brodt |
| 2017/0169233 | A1 | 6/2017 | Hsu |
| 2017/0250798 | A1 | 8/2017 | Enga |
| 2017/0308578 | A1 | 10/2017 | Chen |
| 2018/0349422 | A1 | 12/2018 | Tsuchida |
| 2020/0042518 | A1* | 2/2020 | Brunel ............... G06F 16/2246 |
| 2020/0151268 | A1 | 5/2020 | Johnson |
| 2021/0133929 | A1 | 5/2021 | Ackerson |
| 2021/0152328 | A1 | 5/2021 | Enga |
| 2021/0209088 | A1 | 7/2021 | Zheng |

OTHER PUBLICATIONS

Szalay, "Indexing the Sphere with the Hierarchical Triangular Mesh," Technical Report MSR-TR-2005-123, Microsoft Research, Redmond WA, Aug. 2005, 23 pages.
International Search Report and Written Opinion dated Sep. 16, 2022 cited in PCT/US2022/073169, 9 pages.
International Search Report and Written Opinion dated Sep. 16, 2022 cited in PCT/US2022/073170, 9 pages.
International Search Report and Written Opinion dated Sep. 16, 2022 cited in PCT/US2022/073171, 8 pages.
Nadel. "Creating A Composite Index Using Ancestral Keys In A Hierarchical Database Table Design." Jun. 24, 2019, retrieved by the ISA/US in PCT/US2022/073170 on Aug. 12, 2022 from <www.bennadel.com/blog/3643-creating-a-composite-index-using-ancestral-keys-in-a-hierarchical-database-table-design.hhn>.
Liu et al. "Research and implementation of mass remote sensing image data storage and management." 2010 IEEE International Conference on Progress in Informatics and Computing. vol. 1. IEEE, 2010.Dec. 12, 2010 (Dec. 12, 2010) Retrieved on Aug. 13, 2022 from <https:Bieeexplore.ieee.org/abstract/document/5687478> in PCT/US2022/073171.
Graybox "Storing Hierarchical Data in a Database." Sep. 10, 2014, retrieved by ISA/US in PCT/US2022/073169 on Aug. 14, 2022 (Aug. 14, 2022) from <www.graybox.co/knowledge/blog/storing-hierarchical-data-in-a-databases.
Nievergelt et al. The Grid File: An Adaptable, Symmetric Multikey File Structure. 1984. ACM Trans. Database Syst. 9, 1 (Mar. 1984), 38-71. https://doi.org/10.1145/348.318586 (Year: 1984).
Freeston The BANG file: a new kind of grid file. The BANG file: A new kind of grid file. 1987. In Proceedings of the 1987 ACM SIGMOD international conference on Management of data (SIGMOD '87). Association for Computing Machinery, New York, NY, USA, https://doi.org/10.1145/38713.38743 (Year: 1987).
Anjum et al. BangA: An efficient and flexible generalization-based algorithm for privacy preserving data publication. 2017. Computers, 6(1), 1. doi:http://dx.doi.org/10.3390/computers6010001. (Year: 2017).
WO/ISR dated Sep. 22, 2022 in PCT/US22/73168.
U.S. Appl. No. 17/808,966 entitled Organizing Information Using Hierarchical Data Spaces, filed Jun. 24, 2022 (Jun. 24, 2022) to David Enga (108).
U.S. Appl. No. 17/808,968 entitled Composite Operations Using Multiple Hierarchical Data Spaces, filed Jun. 24, 2022 (Jun. 24, 2022) to David Enga (109).
U.S. Appl. No. 17/808,973 entitled Executing Hierarchical Data Space Operations, filed Jun. 24, 2022 (Jun. 24, 2022) to David Enga (110).

* cited by examiner

100 ⌐

| Column | Constraints | Data Type | Logical Data Space 1 | Logical Data Space 2 |
|---|---|---|---|---|
| Name | PK | Varchar(64) | StringSpace 1 | StringSpace 2 |
| Birth Date | None | Datetime | DateTimeSpace 1 | DateTimeSpace 2 |
| Age | None | Integer | IntSpace 1(0,150) | IntSpace 2(0,150) |
| Salary | None | Numeric | NumericSpace 1 | NumericSpace 2 |
| Location | Unique | Geospatial | GeospatialSpace 1 | GeospatialSpace 2 |

| Physical Data Space | Key | Logical Data Space 1 | Logical Data Space 2 |
|---|---|---|---|
| A | Name | StringSpace 1 | StringSpace 2 |
| B | Location | GeospatialSpace 1 | GeospatialSpace 2 |

FIG.1B

TRANSFORMING RELATIONAL STATEMENTS INTO HIERARCHICAL DATA SPACE OPERATIONS

PRIORITY

This application claims the benefit of U.S. Provisional Patent Application No. 63/203,148, filed on Jul. 9, 2021, and entitled "TRANSFORMING RELATIONAL STATEMENTS INTO HIERACHICAL DATA SPACE OPERATIONS," which application is incorporated herein by reference.

FIELD OF THE DISCLOSURE

The present disclosure relates to information management, and more particularly to a system for transforming a statement for performing operations on one or more relations into operations in one or more hierarchical data spaces.

BACKGROUND

Relational data management systems were designed and implemented to operate in the relational data model using either row or columnar approaches for organizing relations by the value of specified attributes, also known as columns. These systems support relational algebra or calculus on the values of these columns using common languages and interfaces. Row-oriented approaches typically store relations as rows in a clustered index. The data structures used for indexing the rows operate by comparing or sorting the values for a specified key column. Sometimes rows are stored without indexing based in the order they are received in a heap data structure. Column-oriented approaches typically store the values of each column of each relation separately so that queries involving only a few columns only must load those columns from disk. When these columns are unsorted, the query processor must scan the entire column to perform a query.

SUMMARY

Accordingly, embodiments of the invention are directed to a system and method for transforming a statement for operating upon one or more relations into hierarchical data space operations that substantially obviates one or more of the problems due to limitations and disadvantages of the related art.

In one aspect, a system for transforming a statement to generate at least one hierarchical data space operation includes a memory that stores instructions, and a processor that executes the instructions to perform operations. The operations may include analyzing the statement to produce at least one transformed statement. The operations may include selecting at least one element of the at least one transformed statement. The operations may further include determining at least one column for the at least one element. The operations may further include extracting at least one value for the at least one column. The operations may further include determining a first logical hierarchical data space. The operations may further include generating at least one first hierarchical path identifier for the at least one value that preserves the hierarchy of its first logical hierarchical data space, wherein each value corresponds to at least one subdivision of its first logical hierarchical data space. The operations may further include generating at least one hierarchical data space operation. The at least one hierarchical data space operation may include the at least one first hierarchical path identifier.

In another aspect, a method for transforming a statement to generate at least one hierarchical data space operation includes analyzing, by utilizing instructions from a memory that are executed by a processor, the statement to produce at least one transformed statement. The method may further include selecting at least one element of the at least one transformed statement. The method may further include determining at least one column for the at least one element. The method may further include generating at least one hierarchical data space operation for the at least one element. The method may further include extracting at least one value for the at least one column. The method may further include determining at least one first logical hierarchical data space. The method may further include generating at least one first hierarchical path identifier for the at least one value that preserves the hierarchy of its first hierarchical data space, wherein each value corresponds to at least one subdivision of its first hierarchical data space. The at least one hierarchical data space operation may include the at least one first hierarchical path identifier.

In still another aspect, a computer readable device, which when loaded and executed by a processor, causes the processor to perform operations for transforming a statement to generate at least one hierarchical data space operation including analyzing the statement to produce at least one transformed statement. The operations may further include selecting at least one element of the at least one transformed statement. The operations may further include determining at least one column for the at least one element. The operations may further include extracting at least one value for the at least one column. The operations may further include determining a first logical hierarchical data space. The operations may further include generating at least one first hierarchical path identifier for the at least one value that preserves the hierarchy of its first logical hierarchical data space, wherein each value corresponds to at least one subdivision of its first logical hierarchical data space. The operations may further include generating at least one hierarchical data space operation. The at least one hierarchical data space operation may include the at least one first hierarchical path identifier.

BRIEF DESCRIPTION OF THE DRAWINGS

The accompanying drawing, which is included to provide a further understanding of embodiments of the invention and are incorporated in and constitute a part of this specification, illustrate embodiments of the invention and together with the description serve to explain the principles of embodiments of the invention.

FIG. 1A shows a method of associating multiple, different logical hierarchical data spaces to the columns of a relational schema according to various embodiments;

FIG. 1B shows a method for specifying the physical hierarchical data spaces for a relation and associating multiple, different logical hierarchical data spaces to those physical hierarchical data spaces according to various embodiments;

DETAILED DESCRIPTION OF THE EMBODIMENTS

Figure 1C:
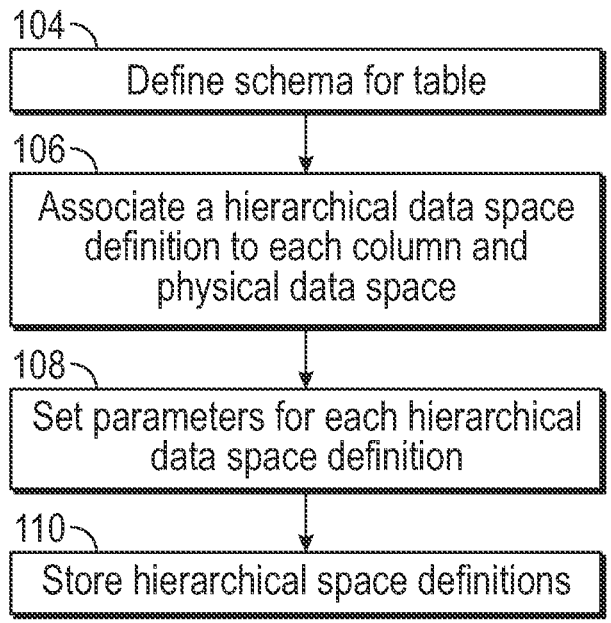
FIG. 1C shows a method of associating logical hierarchical data spaces with the columns or physical hierarchical data spaces of a relation according to various embodiments.

Reference will now be made in detail to embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete and will fully convey the concept of the invention to those skilled in the art.

Relational and columnar data management systems organize information as one or more relations, or tables. A relation is a set of tuples where the value of each attribute, or column, of the tuple is a member of a data domain. Tuples are stored as rows based on the value of one or more specified key columns or stored as separate columns or stored as a combination of rows and columns. A statement comprises at least one operation on at least one relation. These operations may include but are not limited to queries, joins, inserts, bulk inserts, merges, updates, upserts, deletes, or data definition language operations such as create, alter, or drop. Statements can be written in any declarative language such as SQL, any imperative language such as C or Java, or a combination. Statement elements may include but are not limited to expressions, operators, functions, constants, conditions, variables, values, and sub-statements.

A relational schema defines the structure of a table and a set of constraints defined for the columns in the table. FIG. 1A shows a schema 100 that has five named columns. They are Name, BirthDate, Age, Salary, and Location. Name is from the domain of variable length characters (varchar). BirthDate is from the domain of datetime. Age is from the domain of integers. Salary is from the domain of real numbers (numeric). Location is from the geospatial domain.

A logical hierarchical data space is a space that is divided into a set of subdivisions. Each subdivision is recursively subdivided and so on until a maximum depth is reached. Data values can be projected onto the space so that the path through the subdivisions holding the value can be identified. This path is called a hierarchical path identifier. The path can be used to not only find the subdivision in the hierarchical data space but also the path through a hierarchical data structure such as a tree or a graph representing the hierarchical data space. As used herein, a "physical hierarchical data space" refers to a hierarchical data structure that contains nodes and edges corresponding to the recursive subdivisions of one or more logical hierarchical data spaces.

A significant difference between hierarchical data spaces and indexing data structures is that hierarchical data spaces do not organize data or records by comparing data values. Instead of using a primary key data value, tuples are placed in physical hierarchical data spaces based on node specified by one or more hierarchical path identifiers. Candidate tuples can then be found probabilistically in a physical hierarchical data space using hierarchical path identifiers instead of data values. Hierarchical path identifiers cannot uniquely identify a tuple.

The attributes of each tuple may also be associated with one or more different hierarchical data spaces. An operation that wishes to act on a specific attribute of the tuple can probabilistically evaluate the hierarchical path identifiers for that attribute prior to or without evaluating the attribute itself. Hierarchical data spaces preserve hierarchy so that they can efficiently support probabilistic bounding, range, multi-dimensional, intersection, and relational queries. Hierarchical data spaces support range query by preserving hierarchy instead of preserving order. In fact, hierarchical data spaces have no inherent notion of order.

The ability to transform a statement in the relational domain into a set of hierarchical data space operations allows complex sets of relations to be organized and operated upon probabilistically using hierarchical path identifiers in both physical and logical hierarchical data spaces before operating upon the actual values of a relation, substantially obviating one or more of the problems due to limitations and disadvantages of the related art.

A hierarchical data space operation is any operation that uses one or more hierarchical path identifiers to accomplish a given task. As used herein, a "physical hierarchical data space operation" refers to hierarchical data space operations that store or access tuples to perform operations in a physical hierarchical data space using one or more hierarchical path identifiers. Hierarchical data space operations can include any operation that can be performed on a tuple. As used herein, a "logical hierarchical data space operation" refers to hierarchical data space operations that use one or more hierarchical path identifiers to perform operations on a tuple. Typically, one or more hierarchical path identifiers are used to probabilistically filter the tuple before performing the operation. While a physical hierarchical data space operation is also a logical hierarchical data space operation, a logical hierarchical data space operation is not necessarily a physical hierarchical data space operation. The difference is that a physical hierarchical data space operation interacts with a physical hierarchical data space to store or access tuples.

A logical hierarchical data space is described by a hierarchical data space definition. In one embodiment, the hierarchical data space definition comprises the function and parameters that map a value for a specific data type to at least one subdivision of a hierarchical data space. There are many different mapping functions, combinations of functions, and parameters that may be used. The parameters of the hierarchical data space definition modify how the function maps a data value to the subdivisions of the hierarchical data space. For example, the domain of 32-bit integers is −2,147,483,648 to 2,147,483,648, but the range of integer values expected in a column such as the Age column in schema 100 may be 0 to 125. Mapping the smaller range to the entire space may make queries against the hierarchical data space more selective. In another embodiment, the hierarchical data space definition could specify a script or software code that maps a value to at least one subdivision of a hierarchical data space.

Schema 100 shows a schema for a table and the assignment of two logical hierarchical data spaces to each column. More than one logical hierarchical data space definition may be associated with each column. Using multiple different logical hierarchical data space definitions can improve the selectivity of a query or operation that uses hierarchical path identifiers to find probabilistic matches. Tuples that have a valid hierarchical path identifier for a query's hierarchical path identifier for the same hierarchical data space are a candidate match. The probability they are a match increases with every additional hierarchical data space where the query matches the candidate. If the candidate value's hierarchical path identifier is not valid for the query's corresponding hierarchical path identifier, then the probability it is a match is zero. The hierarchical data spaces must have different subdivisions, or the use of multiple hierarchical data spaces will not increase the selectivity. Ensuring each hierarchical data space has different subdivisions may be accomplished by specifying different parameters or by using different hierarchical space definitions that inherently subdivide space differently.

Schema 100 defines the columns for a table. In at least one embodiment, the entire schema may be declared in a create table statement. In yet another embodiment, the base schema information for the table such as column name and data type may be specified in a create statement and the other attributes specified in one or more additional statements. In yet another embodiment, an application programming interface (API) can be used. The entire schema can be specified in one call to the API or the schema could be created using multiple API calls. Various other embodiments are contemplated including but not limited to specifying it in application code, using a different or combined set of fields to specify it in the schema, or storing it separately.

Various embodiments for associating at least one logical hierarchical data space with a column are contemplated, including but not limited to explicitly identifying at least one logical hierarchical data space for each column in a schema or maintaining a mapping between one or more columns for a table and at least one hierarchical data space. In yet another embodiment, logical hierarchical data spaces may be specified for a physical hierarchical data space. This enables the assignment of an appropriate logical hierarchical data space that can map all the column values, potentially of different types, that might be included in the key.

Schema 100 specifies the column name, constraints, data type, and logical data spaces for each column. In at least one embodiment, three different logical hierarchical data spaces are associated with each physical hierarchical data space. In addition to associating logical hierarchical data spaces to a column, other useful information can be specified in the schema.

The data type attribute specifies the domain for the column and optionally the length or the range of the data. The constraint column allows various constraints to be set for a given column. For example, a primary key constraint indicates that the column is part of the primary key for the default physical hierarchical data space.

The constraints attribute allows a variety of constraints to be specified, such as whether the column is part of the primary key for the default physical hierarchical data space.

FIG. 1B shows the physical hierarchical data spaces for the relation defined by schema 100. This is necessary so that the relation can be stored in physical hierarchical data spaces using hierarchical path identifiers instead of in indexing data structures that sort records by value. Logical data spaces are specified for each physical hierarchical data space. These may or may not correspond to the same logical data spaces for the columns used in the key for the physical hierarchical data space.

The attributes of a schema comprising the physical hierarchical data spaces, columns, and logical hierarchical data spaces are used by a statement processor to transform an incoming statement into one or more hierarchical data space operations. The statement processor uses this information to determine which columns and associated values to use for each hierarchical data space operation, and which logical hierarchical data spaces to use for generating the hierarchical path identifiers for those values. The statement processor typically generates at least one physical hierarchical data space operation, but it may also generate additional physical and logical hierarchical data operations. These operations may be nested.

FIG. 1C shows the process for defining a schema and associating logical hierarchical data spaces with each column or physical hierarchical data space for the table. The process starts with step 104, defining a schema for the table. In one embodiment, a schema is created and stored in the data management system. In an alternate embodiment, the schema can be created each time an operation needs to be executed. In another embodiment, the schema could be stored in an external catalog.

To create a schema, each column is specified along with the data type for the column. In step 106, a logical hierarchical data space is associated with each column and physical hierarchical data space. In at least one embodiment, there is a collection of existing hierarchical data space definitions and one of them is automatically chosen for each column based on the column's data type or other attributes such as data range. In another embodiment, the hierarchical data space definition is explicitly set. In another embodiment, the hierarchical data space definition can be created and explicitly set each time it is used.

In step 108, the parameters are set for each of the logical hierarchical data spaces. The default parameters may also be chosen for any or all the logical hierarchical data spaces. In at least one embodiment, the parameters may be automatically determined based on the information about each column in the schema such as the data type and the length. For example, the Name column of schema 100 has a data type of varchar and a maximum length of 64. The hierarchical data space definition that is well suited to that length of string can automatically be chosen. In another embodiment, the parameters can be set explicitly.

In step 110, the hierarchical space definitions and their parameters may be stored so that they can be specified once and then retrieved. There are many alternative ways these could be stored. For example, they could be stored locally, on a server, in a database table, in an external catalog, or with the schema.

Figure 1D:
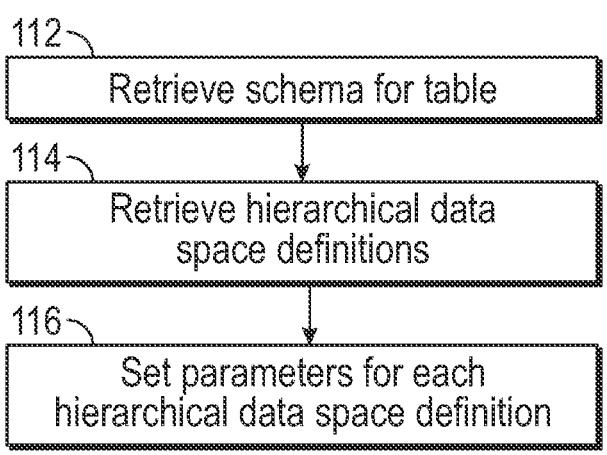
FIG. 1D shows a method of retrieving hierarchical data space definitions for a column or physical hierarchical data spaces of a relation according to various embodiments.

FIG. 1D shows a method for retrieving previously stored schemas and associated hierarchical space definitions. In step 112, the schema is retrieved. In at least one embodiment, the schema can contain the hierarchical data space definitions. In another embodiment, they can be stored separately. The hierarchical data space definitions are retrieved separately in step 114. In at least one embodiment, the parameters are already set in the retrieved hierarchical data space definitions. In another embodiment, they are not already set and must be specified. The parameters are set in step 116. This allows the parameters to be kept secret from the data management system storing the data.

Figure 2A:
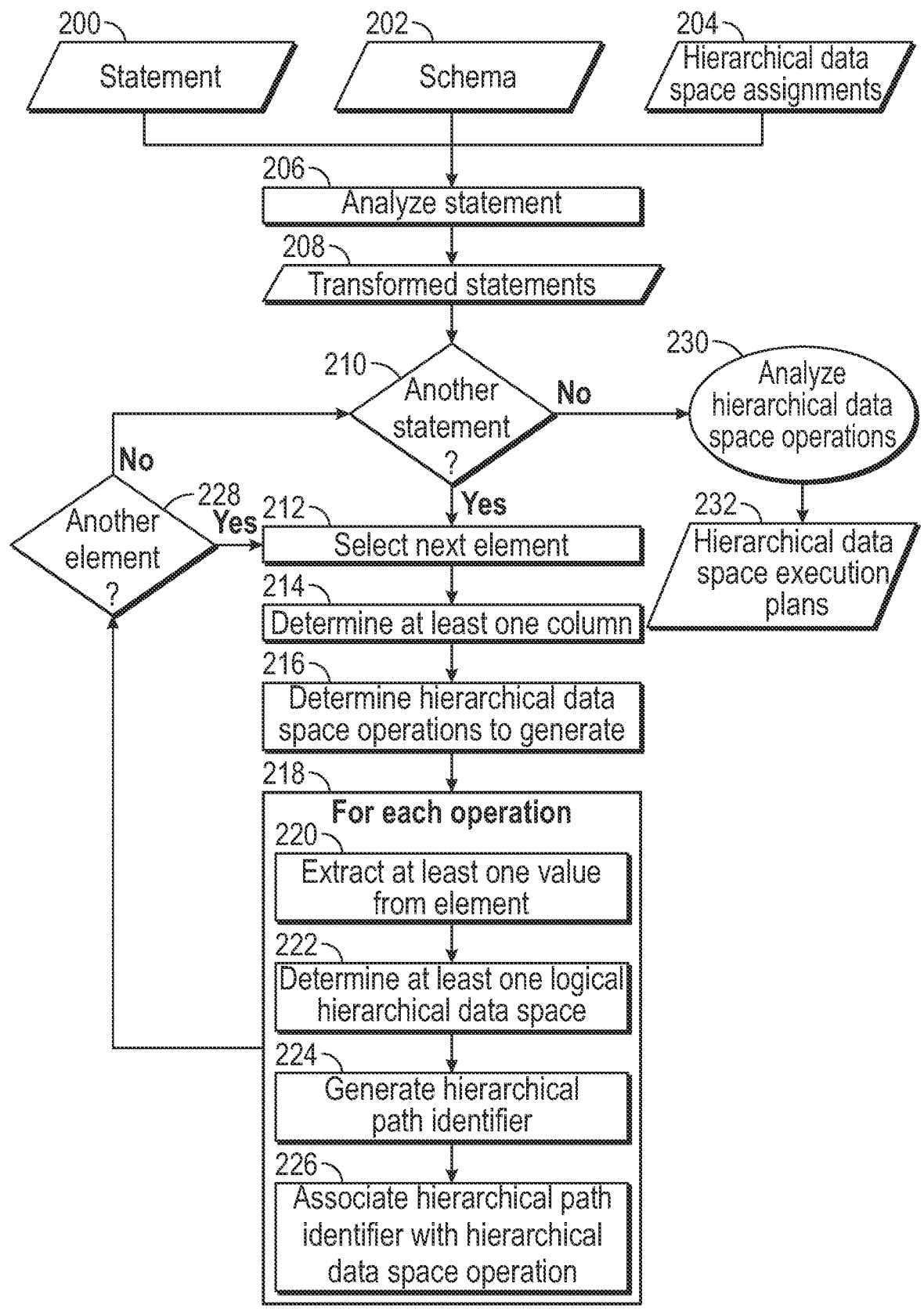
FIG. 2A shows a method of transforming a statement into at least one hierarchical data space operation according to various embodiments.

FIG. 2A shows a method of transforming a statement 200 from the relational domain into hierarchical data space operations. This allows statements in the relational domain to be probabilistically executed using hierarchical data spaces, physical or logical, either prior to or without being executed by value. For example, a client wishes to query a relation without the server hosting the data for the relation knowing the actual values used in the statement. Hierarchical data space operations with secret permutations enable high performance searchable encryption, so that the server can return the probabilistic matches to the query without the server ever receiving the actual values of the query. The ability to transform a complex query statement into a correct and efficient set of hierarchical data space operations allows data management systems to support complex queries without exposing the values of the query to the servers holding the data.

Query access planning is extraordinarily complex in the relational domain. There are multiple NP-hard problems related to transforming Boolean statements into candidate forms such as dualization and generating optimum factored forms. Using physical hierarchical data space operations to efficiently access tuples, logical hierarchical data spaces to probabilistically evaluate those tuples, and then performing final evaluation of the statement on the candidate tuples by value adds additional complexity to query access planning.

Analyzing the statement first in the relational domain and then in the hierarchical data space domain helps simplify this complexity. First, the statement 200 is analyzed in the relational domain as shown in step 206 to transform the statement into at least one candidate transformation that has a uniform structure. Unlike typical analysis in the relational domain, step 206 may output multiple candidate statement transformations. The reason for this is that without knowledge of the to be generated hierarchical data space operations, step 206 may not be able to choose the most efficient transformation. Therefore, the objective of this step is to simplify the statement and to eliminate as many poor transformations as possible. A poor transformation is one that leads to higher than necessary tuple access costs. The objective is not to choose one ultimate statement transformation. Next, the hierarchical data space operations needed to execute the candidate transformed statements 208 must be generated as shown in steps 210-228. By first analyzing the statement in the relational domain, the set of hierarchical data space operations to be generated may be reduced. Since generating hierarchical path identifiers can require significant computation, this may save a non-trivial amount of computation. Once the hierarchical data space operations are all generated, the hierarchical data space operations and each transformed statement are used to generate the candidate execution plans as shown in step 230. This second analysis phase has the advantage in that it can use the information about the hierarchical path identifiers associated with the hierarchical data space operations to compare the cost of different transformations. For instance, a hierarchical path identifier with a maximum depth is essentially a constant time access. A hierarchical path identifier at root depth is essentially a full scan.

Statements may be in a variety of different forms. Statement 200 may be in a declarative language such as SQL or represented using data types and structures in an imperative language such as C or objects in Java. Statement 200 could also be in the form of an already parsed language statement or the output of a parser such as a parse tree.

The elements of statement 200 representing tables and columns need to be resolved to their actual tables and columns before generating hierarchical data space operations. Some elements may also need to have their data types resolved. All the elements of statement 200 may be fully resolved prior to analyzing the statement beginning step 206. If not, step 206 uses schema 202 or a full schema catalog to bind or resolve the elements of the statement to their actual tables, columns, or data types. Because statements may be nested or recursive or may join values from multiple tables, this binding process must include the selected or derived columns of expected result sets or temporary tables. In some instances where a portion of the statement is dependent on a value generated from a sub-statement, then the transformed sub-statement may need to be executed before continuing to process the full statement.

There are often many ways to execute a statement or portions of a statement. Because languages such as SQL support complex expressions and queries, statements may need to be put into a uniform structure to facilitate the selection of the most useful set of hierarchical data space operations to generate. Unlike typical analysis of statements in the relational domain, the objective of step 206 is to analyze the statement to generate one or more transformed statements with the objective of minimizing the number of hierarchical data space operations generated. The uniform structure of these transformations also supports the analysis phase after the generation of hierarchical data space operations. The output of step 206 is at least one transformed statement 208. The at least one transformed statement 208 may specify which form it has been transformed into.

In at least one embodiment, step 206 may bind or associate each element with the candidate physical and logical hierarchical data spaces for that element. As the process continues, these assignments can be carried with each element of the transformed statements.

Step 206 analyzes the statement 200. For a Boolean conditional statement, step 206 will first attempt to simplify or optimize the statement in the relational domain. This includes evaluating constant predicates, capture closure constants, executing simple math, and Boolean algebra reductions such as gather, identity, annihilate, absorb, idempotence, complement, double negation, or De Morgan. Step 206 may also attempt to determine the satisfiability of the Boolean conditions. For instance, "A==1 AND A==3" can never be true.

If step 206 determines the statement could benefit from further transformation, it determines if the statement is already in a uniform structure to facilitate analysis and the optimal generation of physical and logical hierarchical data operations. If not, it can try to transform it into a uniform structure. One of these forms is called modified conjunctive normal form (CNF). An expression is in conjunctive normal form if it contains two or more disjuncts joined by AND operators. This is a canonical form in Boolean algebra known as the product of sums or product of maxterms: (A or B) AND (C or D). For example, "(hair color==brown or hair color==red) AND age<80". The benefit of CNF is that as soon as one of the conditions evaluates to FALSE, the entire expression evaluates to FALSE.

Modified CNF is the same as conjunctive normal form except each disjunct may contain closed ranges as well as predicates. This is important because a closed range is equivalent to a bounding search in a physical hierarchical data space. A disjunct is an expression in which two or more predicates are joined by OR operators. A single predicate such as "hair color==brown" is both a disjunct and a conjunct because it can be transformed with OR FALSE or AND TRUE, respectively.

The CNF and modified CNF simplifies determining which hierarchical data space operations to generate because each term restricts the result set. Therefore, each term can be analyzed to determine if a physical hierarchical data space can be used to access the tuples specified in the term or if they can only be evaluated using logical hierarchical data spaces. In many cases, there will be multiple combinations of physical and logical hierarchical data space operations that can execute each term. In some of these cases, certain combinations can be pruned while still in the relational domain. For instance, a statement in modified CNF form containing a term with a simple predicate on a column with an equal comparison and a schema with an assigned physical hierarchical data space where the column is assigned as the key can eliminates the need to generate physical hierarchical data space operations for any of the other terms.

If the statement is not in modified CNF, step 206 determines if the statement can be converted to modified CNF or if it is optimal to do so. For instance, statements that contain a subquery, a dynamic parameter, or a NOT operator cannot be converted to modified CNF. In some cases, it is not optimal to convert into modified CNF. For instance, the statement may be in disjunctive normal form (DNF) and all the predicates in the statement may have equality operators or LIKE or IN comparison operators. DNF is the sum of products or sum of minterms form: (A AND C) OR (A AND D). It is possible to determine the optimal set of hierarchical data space operations for statements in this form and several others without conversion to modified CNF. For instance, the statement may contain an expression in disjunctive normal form that is AND connected to the rest of the statement. By leaving it in this form, it may be possible to use one or more physical hierarchical data space operations to access the tuples that probabilistically match the expression and then evaluate those tuples against the rest of the statement. In another instance, the statement may include a single predicate that is AND connected to the rest of the statement. If a physical hierarchical data space exists for the column or columns specified in the predicate, then it may be the best physical hierarchical data space to use to access the tuples that match the predicate.

There are additional forms that can be effectively analyzed to determine the minimal set of hierarchical data space operations to generate without conversion to modified CNF. Step 206 checks to see if the statement is in one of these forms and if so, will not try to convert them. Another type of statement that may be analyzed and optimized without conversion is a join condition. A join condition is a predicate that compares a column in one table with a column in another table using the comparison operators <, <=, =, >=, >. A single join condition does not require transformation. However, a join condition with multiple predicates may benefit from transformation to modified conjunctive normal form.

In at least one embodiment, if it is determined that the statement should be converted, then step 206 will convert the statement to modified CNF. The conversion process into modified CNF uses rules such as double negation, De Morgan's Laws, distributive law, simplifying terms, or other algebraic rules to transform the statement. The conversion process into DNF uses logical equivalences, double negation elimination, De Morgan's laws, and the distributive law.

Step 210 iterates through the transformed statements 208. Step 212 traverses through the elements of each transformed statement being processed. Elements may include but are not limited to keywords, identifiers, clauses, conditions, expressions, constants, variables, predicates, data query statements, data manipulation statements, data definition statements, and data control statements. Elements may contain sub-elements. The elements may be arranged in a tree. In at least one embodiment, traversal is performed using depth first traversal so that sub-elements can be processed and executed first if necessary. This is equivalent to calling this entire method recursively for each sub-element of a given element. The parts of the statement considered elements by step 212 depend on the type of statement. For instance, if the statement is a query, it may process the statement predicate by predicate. A predicate is a Boolean expression on a column without any AND or OR Boolean operators. For an insert statement, the element could also be an assignment of a value to a column for a mutation such as an insert or update. The element could also be an expression with multiple assignments of values to columns.

Step 214 determines at least one column associated with the element. If the element is a predicate, then there will be one column. For other more complex elements, there may be multiple columns. The column must be determined so that the physical and logical hierarchical data spaces associated with it can be found. The at least one column, the current transformed statement being processed, schema 202 and hierarchical data space assignments 204 are used by step 216 to determine which, if any, hierarchical data space operations to generate. For example, predicates in a query statement require an HDSOp so that the predicate can be probabilistically evaluated. If the at least one column is a key for one or more physical hierarchical data spaces, then an HDSOp for each physical hierarchical data space will be generated. For columns that are part of composite keys for a physical hierarchical data space, step 206 will attempt to combine them in the transformed statement 208. Step 218 will be executed for each hierarchical data space operation that step 216 determines need to be generated.

The first step in generating at least one hierarchical data space operation is step 220, extracting at least one value from the element for the at least one column. The at least one value will be used to generate a hierarchical path identifier.

Step 222 will determine at least one logical hierarchical data space to use. Step 222 can use the columns, schema 202, and the hierarchical data space assignments 204 to select a logical hierarchical data space. Alternatively, step 216 could assign which physical or logical hierarchical data space to use in generating the HDSOp. Step 222 could then simply use that assignment.

Step 224 will generate at least one hierarchical path identifier for the at least one value using the logical hierarchical data space. Step 226 will then associate the hierarchical path identifier with the hierarchical data space operation. A hierarchical data space operation is comprised of at least one hierarchical path identifier and may also include other information needed to perform the operation.

For example, an insert statement for table with FIG. 1A schema 100 would include the Name column, which is specified as the primary key column for a physical hierarchical data space. Step 216 will determine that a physical hierarchical data space operation is required to access the physical hierarchical data space using the Name column. Step 220 will extract at least one value from the element associated with the Name column. Step 222 then determines the logical hierarchical data spaces for the Name column and the physical hierarchical data space so that the hierarchical path identifiers can be generated in step 224.

In some cases, the primary key for a physical hierarchical data space may include multiple columns. In that case, step 220 will attempt to extract a value for each column. The values for the different columns may be in multiple elements. The logical hierarchical data space selected in Step 222 could be a compound hierarchical data space, capable of mapping multiple values in multiple dimensions to a hierarchical data space. Step 224 would generate the hierarchical path identifier using the values extracted from the statement. Finally, step 226 would associate the hierarchical path identifier with the hierarchical data space operation.

There may also be additional logical hierarchical data space operations that need to be generated. For example, queries may have complex expressions involving columns other than those used to store the tuple in a physical hierarchical data space. These expressions need to be converted into logical hierarchical data space operations. In this case, step 220 would extract all the values from the expression related to the at least one column determined in step 214. Step 224 would then generate hierarchical path identifiers for each part of the expression. The generated hierarchical path identifiers will be associated with the at least one hierarchical data space operation being generated. Nested expressions and subexpressions follow the same process so that each part of the expression tree has associated hierarchical path identifiers. This allows candidate tuples to be evaluated probabilistically against complex expressions using logical hierarchical path identifiers. The element may also be associated with the hierarchical data space operation. For example, the element may be a conditional predicate or expression. The hierarchical data space operation may be comprised of the hierarchical path identifiers to probabilistically determine if a tuple is a match while also containing the conditional predicate to fully evaluate the tuple.

It is common for multiple statements and the columns they reference to contain common values. Some columns in a relation have low cardinality. In these and other circumstances, efficiency can be gained by caching the hierarchical path identifiers generated in step 224. If the same column, logical hierarchical data spaces, and value reoccurs, step 224 can attempt to retrieve the hierarchical path identifier from cache instead of recalculating it. The hierarchical path identifier must be cached for not only the value but also the logical hierarchical data space since they are unique to both the value and the data space.

Figure 2B:
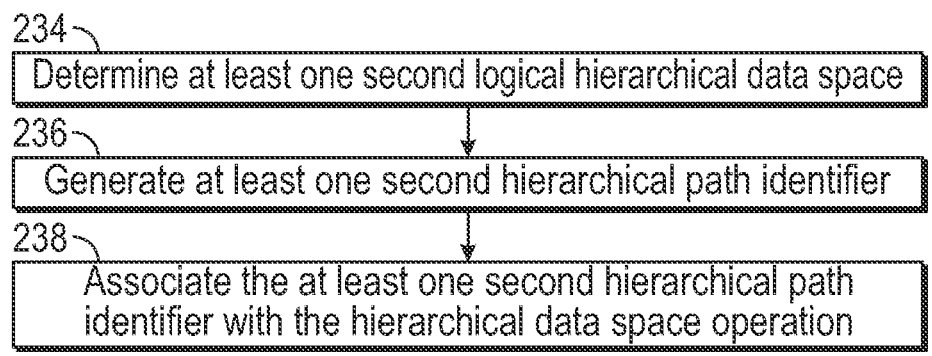
FIG. 2B shows a method of generating and associating at least one second hierarchical path identifier with a hierarchical data space operation according to various embodiments.

Each hierarchical data space operation, whether physical or logical, may be associated with additional hierarchical path identifiers for different hierarchical data spaces. Using multiple hierarchical path identifiers in different hierarchical data spaces enhances the probabilistic selectivity of the operation. Good query performance is not achievable without enough probabilistic selectivity. The ability to transform a statement into a set of hierarchical data space operations with hierarchical path identifiers for multiple, different hierarchical data spaces is essential to probabilistic query selectivity. FIG. 2B shows the process of generating these hierarchical path identifiers and associating them with the hierarchical data space operation. Step 234 determines at least one second logical hierarchical data space. The value or values extracted in step 220 is used by step 236 to generate at least one second hierarchical path identifier. Finally, step 238 associates the at least one second hierarchical path identifier with the hierarchical data space operation.

Hierarchical data space operations either place tuples in specified physical hierarchical data spaces or operate upon tuples stored in physical hierarchical data spaces. When the statement 200 is an insert, tuples are stored in physical hierarchical data spaces based on their associated hierarchical path identifiers. For statements with conditional or other expressions that include an attribute of the relation, one or more hierarchical data space operations will be generated and associated with the expression. For example, a query searching for everyone with age<18 AND age>65 is a binary expression with two nested predicates. Each nested predicate will require a hierarchical data space operation. The predicate age<18 will have a hierarchical data space operation with hierarchical path identifiers for each logical hierarchical data space associated with the age column so that the correct part of the physical hierarchical data space can be searched. The expression age>65 will also have a hierarchical data space operation with a hierarchical path identifier for each logical hierarchical data space associated with the age column. In some cases, expressions like these will be optimized prior to the generation of hierarchical data space operations. For example, a query consisting of two expressions searching for everyone with "age>18 AND age<26" could be transformed into a single expression "age between 18 and 26". This optimized expression would only require a single hierarchical data space operation instead of two.

When the statement is a query or a join, step 224 may decide to transform the element and perform an OR expansion. For open range, closed range, and bounding conditions the query may cross boundaries of subdivisions. The result can be a relatively shallow hierarchical path identifier that will lead to a large portion of a physical hierarchical data space being scanned, much of which may not be pertinent to the query. With OR expansion, a single physical hierarchical data space operation with a shallow hierarchical path identifier can be replaced with multiple physical hierarchical data space operations with deeper hierarchical path identifiers. Each subdivision of the original subdivision pointed to by the hierarchical path identifier is tested to see if it intersects any part of the query condition. If so, a new hierarchical data space operation with the hierarchical path identifier for the subdivision can be connected to the term with an OR. However, all the subdivisions children may not intersect the query, so the process can be repeated recursively. The process becomes counterproductive if the OR expansion includes too many terms. Therefore, the process can be stopped at a maximum number of terms or if there are no more subdivisions to check.

The process continues until all the elements of the statement have been processed.

Once a set of hierarchical data space operations have been generated based on the transformation of the statement in the relational domain, they need to be analyzed to determine which hierarchical data space operations should be used to execute the statement. In step 206, the statement was analyzed in the relational domain. In step 230, the transformed statements 208 will be analyzed in the hierarchical data space domain to determine how to execute the statement using the generated hierarchical data space operations. The results of this analysis are a set of candidate hierarchical data space plans. Each plan will consist of at least one physical hierarchical data space operation and at least one logical hierarchical data space operation. Each plan will also specify a proposed order of operations. Each plan may also include the original statement 200 or the transformed statement.

Predicates that have been pushed down will be considered while analyzing the statement in step 206. For example, statement 200 may be a subquery that is part of a larger query. That query may have a condition that can be used to restrict the result of the subquery. Pushed-down predicates may include already generated physical or logical hierarchical data space operations. The pushed-down predicates and their associated physical and logical hierarchical data space operations will be included as part of the transformed statement. Step 206 will add the pushed down predicate to the transformed statements 208. Only conditions that can be treated as AND conditionals will be pushed down from a parent query. This will typically lead to a statement to be transformed into CNF form.

During analysis, Step 230 will attempt to combine like physical hierarchical data space operations to form a single efficient physical hierarchical data space operation. For transformed statements in CNF, operations will initially be ordered by whether they can be accessed using a physical hierarchical data space. Operations will then be further ordered by depth from deepest to shallowest in their first logical hierarchical data space and then from deepest to shallowest in their second logical hierarchical data space. The reason for this is that deeper operations access less of the physical hierarchical data space and can be assumed to be more selective in logical hierarchical data spaces. The objective is to get the smallest set of candidate tuples accessed first and then further reduce that set with the additional terms in the statement.

Products and sums can be performed on hierarchical path identifiers for the same logical hierarchical data space. This means that as statements are analyzed and transformed with respect to the hierarchical data space operations, terms with hierarchical data space operations can be combined using algebraic operations. OR is the union of the subdivisions of the hierarchical path identifiers. The OR of two hierarchical path identifiers is the common parent subdivision of the subdivisions of both hierarchical path identifiers. AND is the intersection of the subdivisions specified by the hierarchical path identifier. It is the first or shallowest hierarchical path identifier where the two hierarchical path identifiers intersect. An AND that specifies two different subdivisions that do not intersect evaluates to FALSE. Such a statement does not need to access any tuples as none can exist that satisfies the condition.

In not every case should an OR condition be combined as it is possible that performing multiple accesses is more efficient. For instance, if the union of the subdivisions of the hierarchical path identifiers to be combined is at the root depth, the result is essentially the same as a full scan. If the union of subdivisions is close to maximum depth, then it may be more efficient to combine them into a single hierarchical data space operation. One of the transformations that step 230 will consider for transformed statements in DNF is OR expansion. OR expansion is a transformation that generates a plan that can be used to optimize disjunctive queries to avoid full scans. Transformed statements in DNF that have physical hierarchical data spaces for each term can use their physical hierarchical data space operations to collect the tuples. The results from each physical data space operation are then unioned, removing any duplicates.

Various other embodiments are contemplated, including but not limited to performing these steps in a different order or combining the steps.

Figure 3:
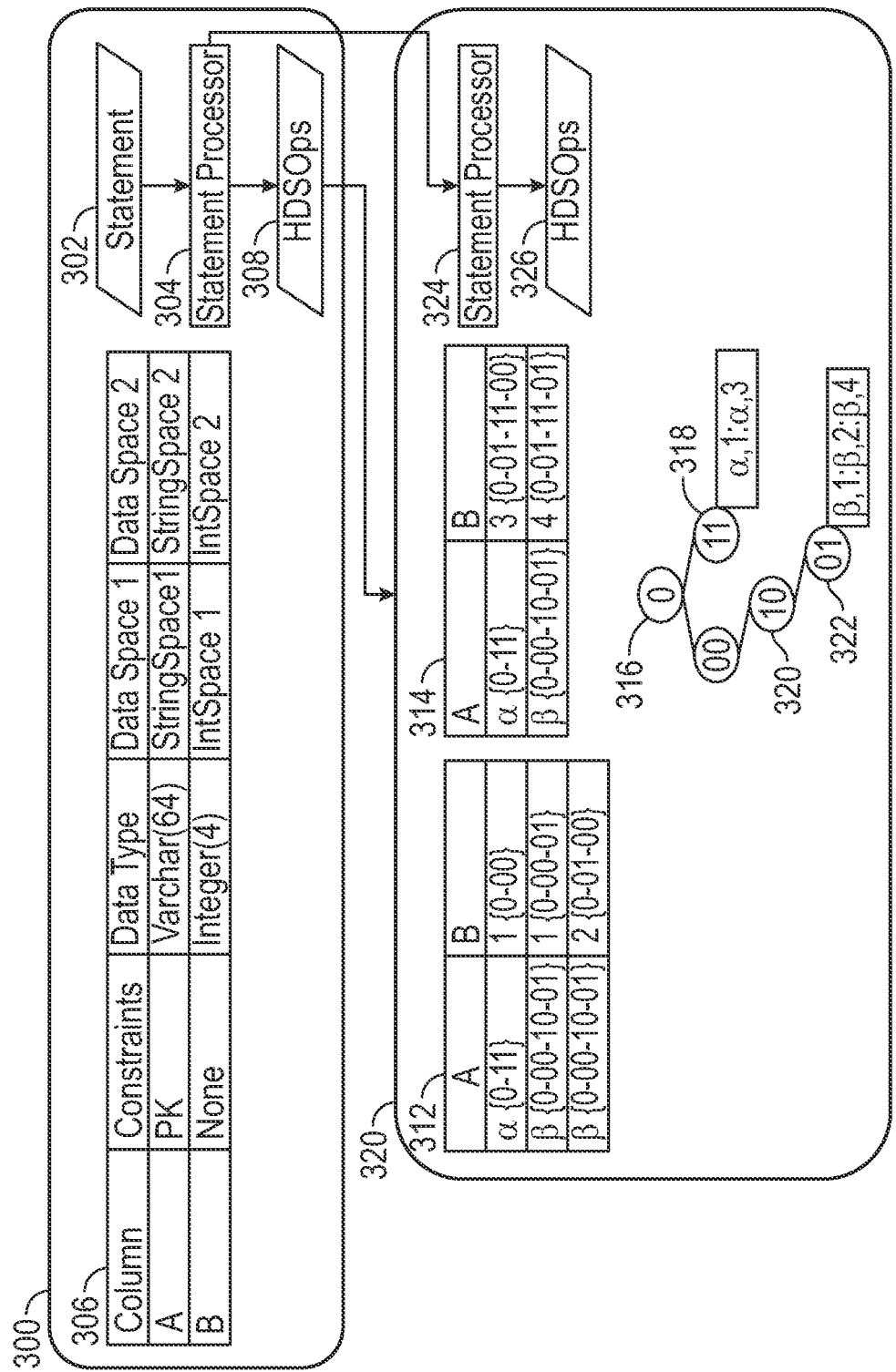
FIG. 3 shows a statement being transformed into hierarchical data space operations that are executed using a physical hierarchical data space hosted on a server according to various embodiments.

FIG. 3 shows a client 300 transforming a statement 302 using statement processor 304 and schema 306 into the hierarchical data space operations (HDSOps) 308 needed to insert, query, or otherwise operate upon the rows and columns stored in server 310 for table 312 and table 314. The contents of table 312 and table 314 are stored in physical hierarchical data space 316 based on their associated hierarchical path identifiers.

In at least one embodiment, a statement processor is part of a client 300. The prepared statements are sent to a server 310 to perform HDSOps 308.

In another embodiment, a statement processor 322 may be part of a data management server 310. If the statement processor is on a data management server 310, then the statement 302 is sent to server 310 and transformed by the statement processor 324 into HDSOps 326. The server can then perform the HDSOps on physical hierarchical data space 316 locally. Various other embodiments are contemplated including but not limited to embedding a statement processor as part of application software, proxy, software library, or in end user devices such as phones or IoT devices.

Schema 306 is the schema for table 312 and table 314. Table 312 contains 3 rows. To perform the insert statement for the first row, the statement processor 304 will generate a tuple containing ($\alpha$, 1) associated with hierarchical path identifier {0-11}. {0-11} is the hierarchical path identifier for the value a. It is used to generate a physical hierarchical data space operation to store the tuple because a is the value for the primary key column as specified in schema 306. This physical hierarchical data space operation is executed to insert the first row into the physical hierarchical data space 316. This can be repeated for every row in table 312 and table 314.

Once these hierarchical data space operations are performed the tuples will be present in the physical hierarchical data space 316 and can then be queried using a query statement. The statement processor 304 will convert a query statement into a set of hierarchical data space operations necessary to gather all the candidate tuples necessary to answer the query. For example, a statement querying for all tuples that have a column A value of a in table 312 will use the physical hierarchical data space 316 to find the tuples that could have that value. The statement processor 304 will determine the hierarchical data space operations needed to use for performing the query. For example, the statement may contain a clause "where A=$\alpha$". A hierarchical data space operation to contain a hierarchical path identifier {0-11} for the value of a will be generated using the logical hierarchical data space for Column A. Optionally, the hierarchical data space operation may carry with it the expression "where A=$\alpha$". One executed, the matching tuples [($\alpha$,1), ($\alpha$,3)] in physical hierarchical data space 316 at the physical hierarchical data space subdivision 318, {0-11}, will be found. If the query statement were only querying table 312, then only the tuple ($\alpha$, 3) would be returned. If a query was executing "where A=$\beta$", then a hierarchical data space operation will be created to contain the expression and a hierarchical path identifier for the value of $\beta$ using the logical hierarchical data space for Column A. All the matching tuples [($\beta$,1), ($\beta$,2), ($\beta$,4)] in physical hierarchical data space 316 at the physical hierarchical data space subdivision 322, {0-10-10-01}, will be found. Once the tuples are evaluated probabilistically, they can be evaluated against the actual expression.

There are a variety of methods of generating a hierarchical path identifier corresponding to a logical hierarchical data space for a data value, where the data value corresponds to a subdivision of the hierarchical data space.

Figure 4A:
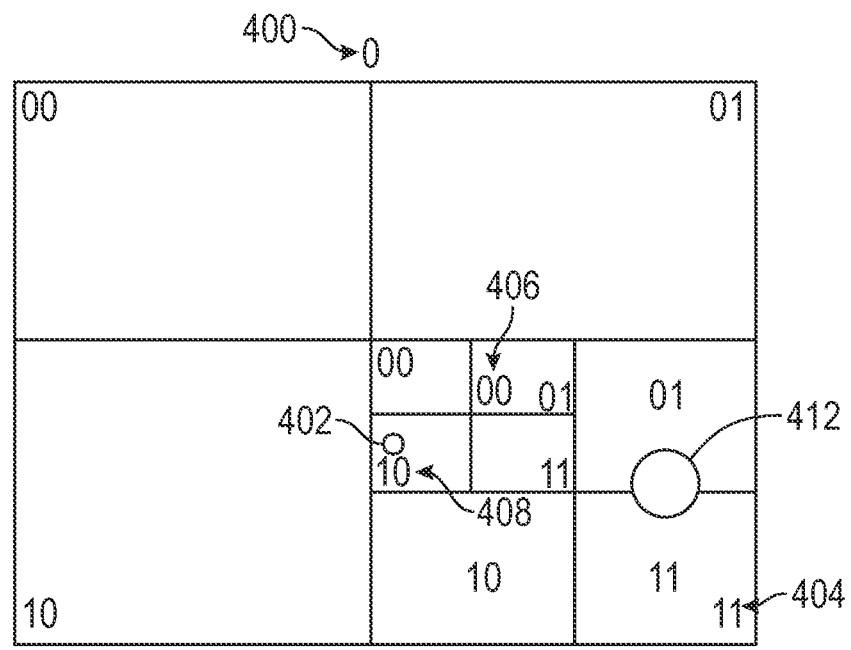
FIG. 4A shows a method generating a hierarchical path identifier (HPId) corresponding to a value for a logical hierarchical data space according to various embodiments.

FIG. 4A shows a method generating a hierarchical path identifier (HPId) corresponding to a value for a logical hierarchical data space. In various embodiments, the method may be used with hierarchical data spaces that include one or more dimensions. In the illustrated embodiment, the hierarchical data space has two dimensions. The initial data space 400 is subdivided into four quadrants. Since data value 402 is located in subdivision 404 {11} of data space 400, the label {11} is appended to the initial data space's HPId {0} depth 0, resulting in HPId {0-11} with depth 1. Depth indicates the number of steps from the root of the data space that the hierarchical path identifier includes. Depth can also be viewed as the number of subdivisions from the root of the data space. For instance, in the illustrated embodiment, depth 1 indicates that the hierarchical path identifier includes one step from the root or the first subdivision. Depth 10 would indicate that the hierarchical path identifier represents a path with 10 steps or 10 subdivisions from the root. Since data value 402 is located in subdivision 404 {11} of initial data space 400, subdivision 404 {11} of data space 400 is chosen to be subdivided. Since data value 402 is located in subdivision 406 {00} of subdivision 404, {00} is appended to the hierarchical path identifier, resulting in path {0-11-00} with depth 2. The next subdivision containing data value 402 is subdivision 408 {10}, resulting in path {0-11-00-10} with depth 3. The recursive process may continue until the depth reaches the maximum depth or the data value is no longer contained in a single subdivision. Data values with size and shape may not reach the maximum depth while point values would always reach a maximum depth. The result is hierarchical path identifier 410.

Since the hierarchical path identifier may terminate before maximum depth is reached, there can be many subdivisions with greater depth beneath this hierarchical path identifier. Thus, in at least one embodiment, hierarchical path identifier 410 may be used to indicate an interest in the subdivision plus all its child subdivisions and all its parents all the way to the root.

FIG. 4A also shows a query 412 that crosses a boundary of two subdivisions. The hierarchical path identifier generated for query 412 would be {0-11} (Depth 2) because it is not fully contained in {0-11-01} or {0-11-11}. Therefore, all of node 404 {0-11} and its children would have to be accessed in any query. This is an example where OR expansion can result in an improvement in access efficiency. Instead of a single hierarchical path identifier {0-11}, two hierarchical path identifiers {0-11-01} and {0-11-11} can be generated and connected with an OR. Performing a boundary query 412 would then be performed by querying {0-11-01} and querying {0-11-11} and unioning the results. This avoids accessing {0-11-00} and {0-11-10} to perform the query. This can result in very large efficiency gains.

Figure 4B:
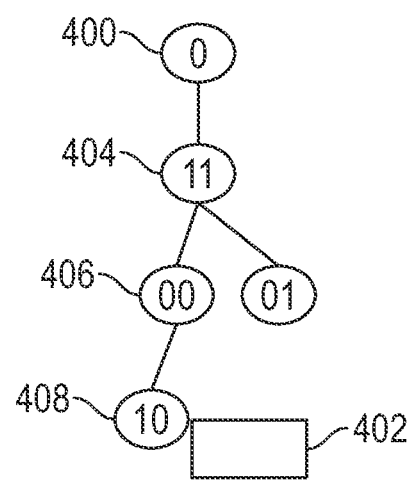
FIG. 4B shows a method of associating a tuple with a physical hierarchical data space using a hierarchical path identifier corresponding to a value corresponding to a subdivision for a logical hierarchical data space according to various embodiments.

FIG. 4B shows a method of associating a tuple corresponding to a data value with a physical hierarchical data space using the hierarchical path identifier corresponding to the value 402 for the logical hierarchical data space shown in FIG. 4A. Node 400 corresponds to the root of the logical hierarchical data space 400 {0}. Node 404 corresponds to subdivision 404 {0-11}. Node 406 corresponds to subdivision 406 {0-11-00}. Node 408 corresponds to subdivision 408 with path {0-11-00-10}. The calculated HPId 410 {0-11-00-10} depth 3 describes the path to node 408 in the physical hierarchical data space. Since hierarchical path identifier 408 can also be used to indicate interest in node 408 and any of its children, hierarchical path identifiers can be used for performing certain types of queries such as range, bounding, and intersection queries. For instance, a query can go to the subdivision 404 {0-11} specified by the hierarchical path identifier and then evaluate all the data tuples in that subdivision and search all child subdivisions. The hierarchical nature of this method may be employed to provide that all values contained by 404 {0-11} are contained in its child subdivisions.

Figure 5A:
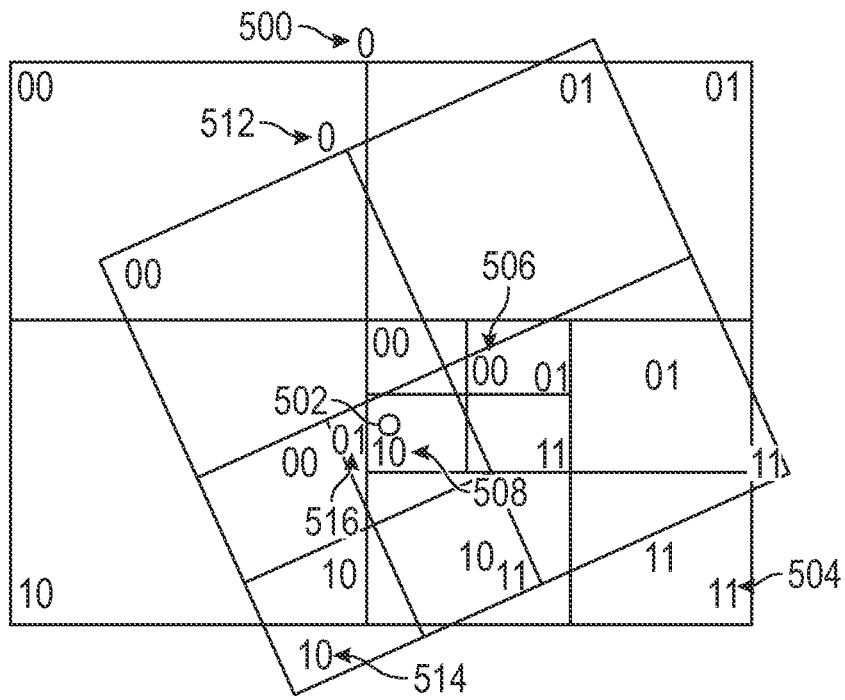
FIG. 5A shows a method of generating a hierarchical path identifier corresponding to a value corresponding to the subdivisions of two different logical hierarchical data spaces according to various embodiments.

FIG. 5A shows a method of generating a hierarchical path identifier corresponding to a value for two different logical hierarchical data spaces. Using multiple different logical hierarchical data spaces allows for more efficient queries of physical hierarchical data spaces and more selective probabilistic filtering during those queries.

The initial logical hierarchical data space 500 is subdivided into four quadrants. Since data value 502 is located in subdivision 504 {11} of data space 500, the label {11} is appended to the initial data space's HPId {0} depth 0, resulting in HPId {0-11} with depth 1. Since data value 502 is located in subdivision 506 {00}, {00} is appended to the hierarchical path identifier, resulting in path {0-11-00} with depth 2. The next subdivision containing data value 502 is 508 {10}, resulting in hierarchical path identifier 518 {0-11-00-10} with depth 3. If max depth is 3 or the data value was contained in multiple child subdivisions, the process would terminate.

The second logical hierarchical data space 512 is different from the first logical hierarchical data space 500. In the illustrated embodiment, logical hierarchical data space 512 is scaled, translated, and rotated. Data value 502 has a different path through the subdivisions in logical hierarchical data space 512 than in logical hierarchical data space 500. To get improved selectivity through using multiple logical hierarchical data spaces, those logical hierarchical data spaces must be different.

The second logical hierarchical data space 512 is subdivided into four quadrants. Since data value 502 is located in subdivision 514 {10} of data space 512, the label {10} is appended to the initial data space's HPId {0} depth 0, resulting in HPId {0-10} with depth 1. Since data value 502 is located in subdivision 516 {00}, {01} is appended to the hierarchical path identifier, resulting in path 520 {0-10-01} with depth 2. If the tuple is contained in multiple child subdivisions or max depth is reached, the process stops.

Figure 5B:
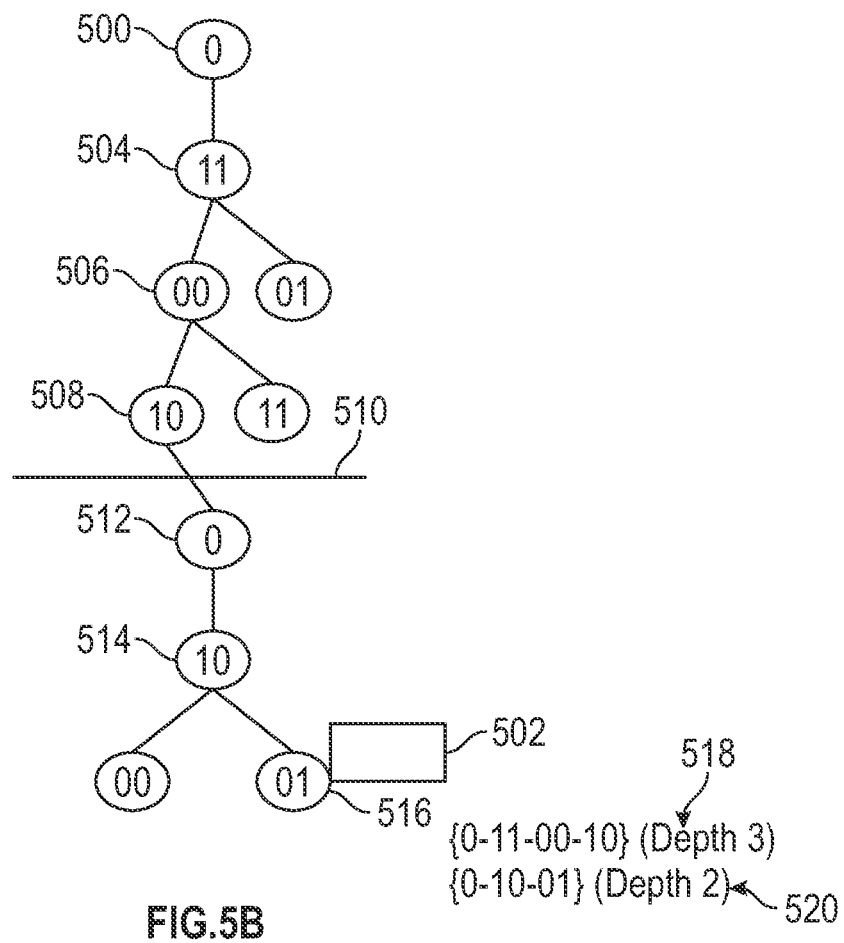
FIG. 5B shows a method of associating a tuple with two connected physical hierarchical data spaces using hierarchical path identifiers corresponding to a value corresponding to the subdivisions of two different logical hierarchical data spaces according to various embodiments.

FIG. 5B shows a method of associating a tuple corresponding to data value 502 with two connected physical hierarchical data spaces using hierarchical path identifiers corresponding to a value for the two different logical hierarchical data spaces shown in FIG. 5A. Node 500 corresponds to the root of the logical hierarchical data space 500 {0}. Node 504 corresponds to subdivision 504 {0-11}. Node 506 corresponds to subdivision 506 {0-11-00}. Node 508 corresponds to subdivision 508 with path {0-11-00-10}. The calculated HPId 518 {0-11-00-10} depth 3 describes the path to node 508 in the physical hierarchical data space. Node 508 is connected to the second physical hierarchical data space 512 corresponding to the logical hierarchical data space 512. Connected physical hierarchical data space has a root node 512 {0} with a child node 514 {0-10} corresponding to subdivision 514. Node 514 has a child node 516 corresponding to subdivision 516. Node 514 has a tuple corresponding to data value 502. A tuple with hierarchical path identifiers corresponding to a data value with two different logical hierarchical data spaces can therefore be associated with two connected physical hierarchical data spaces. The benefit is that there may be many tuples in physical hierarchical data space node 508 that have the same hierarchical path identifier for the first logical hierarchical data space but have different hierarchical path identifiers for the second logical hierarchical data space. By storing them in a second physical hierarchical data space, the tuples are distributed across more physical hierarchical data space subdivisions. A query with hierarchical path identifiers for both hierarchical data spaces can therefore walk through the nodes of the connected physical hierarchical data spaces, avoiding having to access any tuples that are not on the query path.

When statement processor 304 generates hierarchical data space operations, it can generate a second hierarchical path identifier corresponding to a second, different logical hierarchical data space so that the tuples can be re-distributed in a second physical hierarchical data space. It also allows tuples to be probabilistically evaluated in more than one logical hierarchical data space, even when they are not re-distributed into a second, attached physical hierarchical data space. The statement processor simply determines the additional logical hierarchical data spaces to use and then generates the hierarchical path identifiers for those spaces. As many different logical hierarchical data spaces as desired can be used. Physical hierarchical data space subdivision 606 shows a tuple that has a first hierarchical path identifier {0-11} and a second hierarchical path identifier {0-01-11}. In FIG. 3, the physical hierarchical data space 316 could use this same technique to redistribute the tuples more efficiently. Schema 306 shows a second logical hierarchical data space, "Logical Data Space 2", configured for each column.

Figure 6:
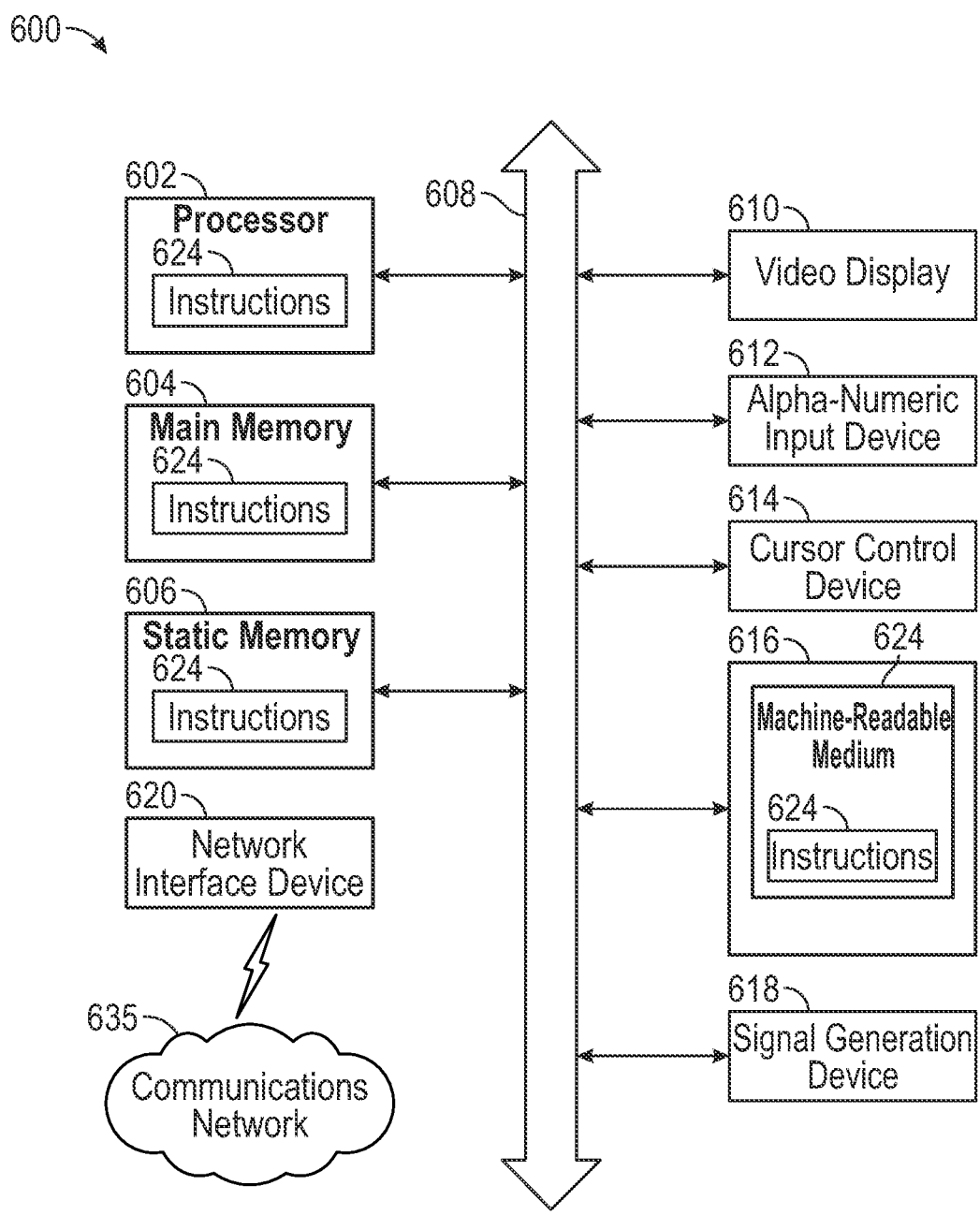
FIG. 6 is a schematic diagram of a machine in the form of a computer system within which a set of instructions, when executed, may cause the machine to perform any one or more of the methodologies or operations of the systems and methods for preparing statements for operating upon one or more relations.

Referring now also to FIG. 6, at least a portion of the methodologies and techniques described with respect to the exemplary embodiments of the method and system 200/300 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 200/300. For example, the machine may be configured to, but is not limited to, assist the system 200/300 by providing processing power to assist with processing loads experienced in the system 200/300, by providing storage capacity for storing instructions or data traversing the system 200/300, or by assisting with any other operations conducted by or within the system 200/300.

In some embodiments, the machine may operate as a standalone device. In some embodiments, the machine may be connected (e.g., using communications network 635, another network, or a combination thereof) to and assist with operations performed by other machines and systems. The machine may be connected with any component in the system 200/300. In a networked deployment, the machine may operate in the capacity of a server or a client, such as a client user machine, in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 635, another network, or a combination thereof, can send or receive voice, video or data, and to communicate over the communications network 635, another network, or a combination thereof, using the instructions. The instructions 624 may further be transmitted or received over the communications network 635, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system for transforming a statement into at least one hierarchical data space operation, the system comprising:
a memory that stores instructions; and
a processor that executes the instructions to perform operations, the operations comprising:
analyzing the statement to produce at least one transformed statement;
selecting at least one element of the at least one transformed statement;
determining at least one column for the at least one element;
generating at least one hierarchical data space operation for the at least one element comprising:
extracting at least one value from the at least one element for the at least one column;
determining at least one first logical hierarchical data space for the at least one column, wherein the logical hierarchical data space is a space that is divided into a set of subdivisions, wherein each subdivision is recursively subdivided until a maximum depth is reached or the at least one value is no longer contained in a single subdivision, wherein the maximum depth is specified in a hierarchical data space definition for the first logical hierarchical data space;
generating at least one first hierarchical path identifier for the at least one value that preserves the hierarchy of its first logical hierarchical data space, wherein each value corresponds to at least one subdivision of its first logical hierarchical data space;
associating the at least one first hierarchical path identifier with the at least one hierarchical data space operation;
determining at least one second hierarchical data space;
generating at least one second hierarchical path identifier for the at least one value that preserves the hierarchy of its second logical hierarchical data space, wherein each value corresponds to at least one subdivision of its second hierarchical data space; and
associating the at least one second hierarchical path identifier with the at least one hierarchical data space operation.

2. The system of claim 1 further comprising determining the hierarchical data space operations to generate for the at least one element.

3. The system of claim 1 further comprising generating at least one hierarchical data space operation for at least one physical hierarchical data space.

4. The system of claim 1 wherein the analyzing the statement to produce at least one transformed statement comprises adding a push down predicate.

5. The system of claim 1 wherein the analyzing the statement to produce at least one transformed statement comprises transforming the statement into conjunctive normal form.

6. The system of claim 1 wherein the analyzing the statement to produce at least one transformed statement comprises transforming the statement into disjunctive normal form.

7. The system of claim 1 wherein generating the at least one hierarchical path identifier further comprises performing OR expansion.

8. The system of claim 1 further comprising analyzing the at least one hierarchical data space operation to generate at least one hierarchical data space execution plan.

9. The system of claim 1 further comprising caching a hierarchical path identifier for a value and logical hierarchical data space.

10. The system of claim 1 further comprising:
generating at least one tuple for the statement;

storing the at least one value from the at least one element for the at least one column in a field of the tuple corresponding to the at least one column; and associating the tuple with the at least one hierarchical data space operation.

11. A method for transforming a statement into at least one hierarchical data space operation, the method comprising:

analyzing, by utilizing instructions from a memory that are executed by a processor, the statement to produce at least one transformed statement;

selecting at least one element of the at least one transformed statement;

determining at least one column for the at least one element;

generating at least one hierarchical data space operation for the at least one element comprising:

extracting at least one value from the at least one element for the at least one column;

determining at least one first logical hierarchical data space for the at least one column, wherein the first logical hierarchical data space is a space that is divided into a set of subdivisions, wherein each subdivision is recursively subdivided until a maximum depth is reached or the at least one value is no longer contained in a single subdivision, wherein the maximum depth is specified in a hierarchical data space definition for the first logical hierarchical data space;

generating at least one first hierarchical path identifier for the at least one value that preserves the hierarchy of its first logical hierarchical data space, wherein each value corresponds to at least one subdivision of its first logical hierarchical data space;

associating the at least one first hierarchical path identifier with the at least one hierarchical data space operation;

determining at least one second hierarchical data space;

generating at least one second hierarchical path identifier for the at least one value that preserves the hierarchy of its second logical hierarchical data space, wherein each value corresponds to at least one subdivision of its second hierarchical data space; and associating the at least one second hierarchical path identifier with the at least one hierarchical data space operation.

12. The method of claim 11 further comprising determining the hierarchical data space operations to generate for the at least one element.

13. The method of claim 11 further comprising generating at least one hierarchical data space operation for at least one physical hierarchical data space.

14. The method of claim 11 wherein the analyzing the statement to produce at least one transformed statement comprises adding a push down predicate.

15. The method of claim 11 wherein the analyzing the statement to produce at least one transformed statement comprises transforming the statement into conjunctive normal form.

16. The method of claim 11 wherein the analyzing the statement to produce at least one transformed statement comprises transforming the statement into disjunctive normal form.

17. The method of claim 11 wherein generating the at least one hierarchical path identifier further comprises performing OR expansion.

18. The method of claim 11 further comprising analyzing the at least one hierarchical data space operation to generate at least one hierarchical data space execution plan.

19. The method of claim 11 further comprising caching a hierarchical path identifier for a value and logical hierarchical data space.

20. The method of claim 11 further comprising:

generating at least one tuple for the statement;

storing the at least one value from the at least one element for the at least one column in a field of the tuple corresponding to the at least one column; and associating the tuple with the at least one hierarchical data space operation.

21. A computer readable device, which when loaded and executed by a processor, causes the processor to perform operations comprising:

analyzing, by utilizing instructions from a memory that are executed by a processor, a statement to produce at least one transformed statement;

selecting at least one element of the at least one transformed statement;

determining at least one column for the at least element;

generating at least one hierarchical data space operation for the at least one element comprising:

extracting at least one value from the at least one element for the at least one column;

determining at least one first logical hierarchical data space for the at least one column, wherein the first logical hierarchical data space is a space that is divided into a set of subdivisions, wherein each subdivision is recursively subdivided until a maximum depth is reached or the at least one value is no longer contained in a single subdivision, wherein the maximum depth is specified in a hierarchical data space definition for the first logical hierarchical data space;

generating at least one first hierarchical path identifier for the at least one value that preserves the hierarchy of its first logical hierarchical data space, wherein each value corresponds to at least one subdivision of its first logical hierarchical data space;

associating the at least one first hierarchical path identifier with the at least one hierarchical data space operation;

determining at least one second hierarchical data space;

generating at least one second hierarchical path identifier for the at least one value that preserves the hierarchy of its second logical hierarchical data space, wherein each value corresponds to at least one subdivision of its second hierarchical data space; and associating the at least one second hierarchical path identifier with the hierarchical data space operation.

22. The computer readable device of claim 21 further comprising determining the hierarchical data space operations to generate for the at least one element.

23. The computer readable device of claim 21 further comprising generating at least one hierarchical data space operation for at least one physical hierarchical data space.

24. The computer readable device of claim 21 wherein the analyzing the statement to produce at least one transformed statement comprises adding a push down predicate.

25. The computer readable device of claim 21 wherein the analyzing the statement to produce at least one transformed statement comprises transforming the statement into conjunctive normal form.

26. The computer readable device of claim 21 wherein the analyzing the statement to produce at least one transformed statement comprises transforming the statement into disjunctive normal form.

27. The computer readable device of claim 21 wherein generating the at least one hierarchical path identifier further comprises performing OR expansion.

28. The computer readable device of claim 21 further comprising analyzing the at least one hierarchical data space operation to generate at least one hierarchical data space execution plan.

29. The computer readable device of claim 21 further comprising caching a hierarchical path identifier for a value and logical hierarchical data space.

30. The computer readable device of claim 21 further comprising:
- generating at least one tuple for the statement;
- storing the at least one value from the at least one element for the at least one column in a field of the tuple corresponding to the at least one column; and
- associating the tuple with the at least one hierarchical data space operation.

\* \* \* \* \*